Reissued June 5, 1934

Re. 19,197

UNITED STATES PATENT OFFICE 19,197

PECTIN PRODUCT AND PROCESS OF PRODUCING SAME

Eloise Jameson, Corona, Calif., assignor to California Fruit Growers Exchange, Los Angeles, Calif., a corporation of California No Drawing. Original No. 1,611,528, dated December 21, 1926, Serial No. 63,132, October 17, 1925. Application for reissue May 23, 1932, Serial No. 613,139

27 Claims. (Cl. 99—11)

In the preparation of pectin from different sources such as apple pomace, citrus fruit pulp, beet pulp, etc., various methods of extracting pectin are used and various methods of purifying the pectic solution or of separating the pectin from the solution by drying, precipitation, etc., may be used.

As a result of variations in the process of extraction, isolation, or purification of the pectin, I have discovered that the pectin product may not be uniform as to its acid character. This may be due to the acidity of the pectic substance itself or to the acidity of the product on account of the presence of some added acid remaining as an impurity after certain steps in the commercial process or to both such causes.

The expression pH as here used means the pH of a solution made up as follows: 0.5 gram of the pectin preparation is moistened with 1 cc. of strong alcohol and then dissolved in 100 cc. of water. The pH is determined colorimetrically on this solution.

I have found that unless the acidity of the preparation falls within certain limits as pH 3.4 to pH 7.0 the pectic preparation is not satisfactory for jelly making. The percentage of total acid is not the important point but rather the concentration of hydrogen ions or as it is now usually expressed the pH value.

I have found that for instance if a pectin preparation having a pH of 3.2 is used to make commercial jelly no jelly can be made since it will set in the cooking kettle before it can be poured. If we treat the pectin so as to make the pH 3.7 and then proceed to make the jelly just as before we will produce a perfect commercial jelly.

Now in some pectin preparations where a strong acid such as hydrochloric acid has been used to reduce the mineral ash content of the pectin and a very small amount of HCl is left in the product the pH will be low as for instance 2.6 and such a pectin is not satisfactory for jelly making purposes.

In U. S. Patent No. 1,497,884 there is described a process for the removal of the free HCl with neutral alcohol. This is an expensive and sometimes difficult process and does not admit of as accurate or convenient control of the pectin as does the method herein disclosed.

This invention consists in the adjustment of the pH to the desired point in either of two ways but the underlying chemical principle is the same; namely, that if the salt of a strong base and a weak acid is introduced in proper amount the strong base will combine with the strong acid that is the cause of the low pH value of the pectin and will set free the weak acid which on account of its smaller dissociation constant causes the pH of the pectin preparation to be raised to the desired point.

The proportions of the base and the acid making up the salt should be such that the salt will consist of exact chemical equivalents of the basic and acid radicals which go to make up the salt.

Now assuming that the pectin preparation in question has a pH that is too low we may proceed preferably in one of two ways, as follows:

1st. We may suspend the pectin preparation in alcohol of proper strength (50–95%) in which the salt of a strong base and a weak acid is dissolved or suspended as for instance sodium citrate or sodium acetate and after sufficient time has elapsed for the reactions to take place the pectin is separated from the solution by means of a filter press or other convenient means. The pectin may be washed with alcohol and dried when it is ready for use.

2nd. The powdered pectin may be mixed with a proper amount of the dry salt of a strong base and a weak acid as sodium citrate, sodium carbonate, sodium acetate, etc., so that when the resulting pectin preparation is dissolved the pH will fall within the range pH 3.4 to pH 7.0.

I have found also that if the original somewhat impure pectin preparation, before being washed with the alcoholic HCl, is mixed with the proper proportion of an organic acid such as citric acid or tartaric acid and a salt of a strong base and a weak acid such as sodium acetate or sodium bicarbonate the pectin is quite readily put into solution and is properly standardized as to pH.

The use of a carbonate or a bicarbonate is advantageous here as the liberation of $CO_2$ assists materially in dispersing the pectin particles thus bringing each particle into contact with the solution so that the formation of lumps is avoided and the preparation goes readily into solution.

As a result of the application of this invention I am able to produce a pectin preparation of any desired predetermined pH and thus insure uniformly satisfactory results in the use of the pectin.

Further by the selecting of pectin preparations of varying jellying strength we are able to standardize the product so that each pound of the final pectin preparation will produce satisfactory jelly with a definite amount of sugar.

A typical use of this invention is as follows:

Pectin is produced from any satisfactory source such as apple pomace, citrus fruit pulp, etc., by the method described in U. S. Patent No. 1,497,884 or by some other suitable method.

It sometimes happens that it is difficult or uneconomical to wash out all the hydrochloric acid that has been used in slight excess for the removal of aluminum, calcium or other mineral impurities. We may assume then that we have a dry powdered pectin preparation that contains enough strong acid such as hydrochloric acid to bring the pH value to a point below 3.4 which we have found is the minimum for producing satisfactory jellies.

In accordance with this invention we may proceed in either of two ways to bring the pectin preparation within the pH range of 3.4 to 7.0 which I have found are the limiting values for a pectin preparation to be used for making jelly in the usual manner either with cane sugar or with glucose.

In the practice of my invention the dry pectin preparation is ground to a fine powder and is suspended in alcohol of preferably about 50–95% strength in which is dissolved or suspended sufficient sodium acetate or sodium citrate or other salt of a strong base and a weak acid so that the strong base will combine with the hydrochloric acid in the pectin preparation leaving instead a small amount of the weak acid which may be washed out by the alcohol or which remaining in the pectin preparation will give a pH value within the limits 3.4—7.0.

Or the dry pectin preparation may be powdered and thoroughly mixed with a dry powdered salt of a strong base and a weak acid as sodium citrate, sodium acetate, sodium carbonate, sodium bicarbonate, etc. It is of course important in using such salts as carbonates and bicarbonates that the preparation be not allowed to become alkaline but these preparations, I have observed, have the added value that when a dry pectin preparation containing a carbonate or a bicarbonate is placed in an acid solution the formation of gas bubbles is of material assistance in getting the pectin into solution since the gas bubbles serve to separate the individual pectin particles thus preventing the formation of lumps and allowing the acid juice or water to reach each particle so that solution is readily effected.

Amount of salt to be added is determined by suspending a known weight of pectin in strong alcohol (at least 85% by volume) and titrating an aliquot of this suspension containing about 1 gram of pectin with N/10 NaOH solution using phenolphthalein as indicator. From this titration the amount of salt such as sodium acetate or sodium citrate necessary to combine with all the free strong acid as shown by the titration is calculated. The amount of the salt added to the pectin should be 90 to 99% of the amount indicated by this titration but must in no case exceed the amount.

Or the amount of salt to add is determined by adding to samples of the dry pectin varying known amounts of the described salt and then making jellies with the pectin preparation so made. The mixture giving the best jelly under standardized condition is the one used as a basis for adding such salt to the entire batch of pectin. When the titration method is used the amount of salt added is checked by the jelly making test.

In actual practice the amount of corrective salt added is about 90% to 95% of the amount necessary as indicated by the titration.

The preparation made by the addition of the neutral salt to the original pectin product is much more readily soluble than the original pectin product.

As a result of this mixing of the pectin preparation and neutral salt or both the salt and dry organic acid there is obtained a pectin preparation of definite pH and further in practice I mix several lots of pectin of varying jellying power so that 1 part by weight of the final product will jell 140, 160, 200 or other definite predetermined number of parts by weight of sugar in making regular jelly either with cane sugar or with glucose.

Having fully described my said invention what I claim is:

1. A dry pectin product having a pH of 3.4 to 7.0.

2. A pectin product which is a mixture of an original pectin product with a salt of a strong base and a weak acid.

3. A soluble pectin product which is a mixture of an original water-insoluble pectin preparation, a dry organic acid and a salt of a strong base and an acid weaker than the dry organic acid in such proportions that the pH of the mixture lies between 3.4 and 7.0.

4. A pectin product which is a mixture of an original pectin preparation with a salt of a strong base and a weak acid in such proportions that the pH of the mixture lies between 3.4 and 7.0.

5. An improvement in the process of producing pectin which consists in adding to a pectin preparation which is not of proper pH a salt of a strong base and a weak acid in such proportions that the finished product has a pH of 3.4 to 7.0.

6. An improvement in the process of producing pectin which consists in washing crude or partly purified pectin with a solution (preferably in alcohol of proper strength) of a salt of a strong base and a weak acid so that an exchange is effected in which the strong base unites with the strong acid which may exist as an impurity in the original pectin preparation and thereby form a salt of the strong base and the strong acid leaving a weak acid in place of the strong one, thus bringing the pH of the pectin preparation to any predetermined point.

7. An improvement in the process of producing pectin which consists in adding to a pectin preparation which has not been subjected to an acid-alcohol wash a mixture of an organic acid with a salt of a strong base and an acid weaker than the organic acid used in such proportion that the finished product is soluble and has a pH of 3.4 to 7.0.

8. A dry pectin preparation containing a carbonate or a bicarbonate.

9. A dry pectin product containing an effervescent salt of a strong base and a weak acid.

10. A soluble pectin product which is a mixture of an original pectin preparation with an effervescent salt of a strong base and a weak acid in such proportions that the pH of the mixture lies between 3.4 and 7.0.

11. A finely divided pectin preparation containing pectin and a carbonate or a bicarbonate.

12. A finely divided pectin preparation containing pectin, a carbonate or a bicarbonate, and a dry organic acid.

13. A substantially dry, finely divided pectin preparation containing pectin and an effervescent salt of a strong base and a weak acid.

14. A substantially dry, finely divided pectin preparation containing pectin, an effervescent salt of a strong base and a weak acid, and a dry organic acid.

15. A finely divided, pectin preparation containing pectin, an effervescent salt of a strong base and a weak acid, and finely divided citric acid.

16. A soluble gum composition consisting of a citrus pectin containing substance difficultly soluble in boiling water, sodium bicarbonate and citric acid in slight excess.

17. A soluble pectin product containing pectin difficultly soluble in water, an effervescent salt of a strong base and a weak acid, and a dry organic acid in a quantity at least sufficient to decompose the effervescent salt.

18. A soluble pectin product containing pectin, a carbonate or a bicarbonate, and a dry organic acid in quantity slightly in excess of that required to decompose the carbonate or bicarbonate.

19. The method of dispersing and dissolving difficultly soluble pectin which comprises mixing the pectin with an effervescent salt of a strong base and a weak acid and a dry organic acid in a quantity at least sufficient to decompose the effervescent salt, and placing the mixture in an aqueous medium whereby, through the interaction of the organic acid and the salt, effervescence is produced and the pectin is thereby dispersed in the aqueous medium and its solution facilitated.

20. The method of dispersing and dissolving difficultly soluble pectin which comprises placing in an aqueous medium a mixture of the pectin with an effervescent salt of a strong base and a weak acid and a dry organic acid whereby, through the interaction of the organic acid and the salt, effervescence is produced and the pectin is dispersed in the aqueous medium and its solution facilitated.

21. A pectin product which is a mixture of pectin with a salt of a strong base and a weak acid in such proportions that the pH of the mixture lies between 3.4 and 7.0.

22. A finely divided pectin preparation containing pectin and sodium acetate.

23. A finely divided pectin preparation containing pectin and sodium citrate.

24. A finely divided pectin preparation containing pectin, sodium acetate and a dry organic acid.

25. A dry pectin product containing sodium acetate, said product having a pH of 3.4 to 7.0.

26. A dry pectin product containing sodium citrate, said product having a pH of 3.4 to 7.0.

27. A pectin product adapted for use in the manufacture of commercial jellies, comprising a dry mixture of pectin and a salt of a strong base and a weak acid.

ELOISE JAMESON.

CERTIFICATE OF CORRECTION.

Reissue No. 19,197. June 5, 1934.

ELOISE JAMESON.

It is hereby certified that error appears in the printed specification of the above numbered patent requiring correction as follows: Page 1, first column, line 46, strike out the word "neutral"; and that the said Letters Patent should be read with this correction therein that the same may conform to the record of the case in the Patent Office.

Signed and sealed this 8th day of March, A. D. 1938.

(Seal)

Henry Van Arsdale,
Acting Commissioner of Patents.

preparation containing pectin, an effervescent salt of a strong base and a weak acid, and a dry organic acid.

15. A finely divided, pectin preparation containing pectin, an effervescent salt of a strong base and a weak acid, and finely divided citric acid.

16. A soluble gum composition consisting of a citrus pectin containing substance difficultly soluble in boiling water, sodium bicarbonate and citric acid in slight excess.

17. A soluble pectin product containing pectin difficultly soluble in water, an effervescent salt of a strong base and a weak acid, and a dry organic acid in a quantity at least sufficient to decompose the effervescent salt.

18. A soluble pectin product containing pectin, a carbonate or a bicarbonate, and a dry organic acid in quantity slightly in excess of that required to decompose the carbonate or bicarbonate.

19. The method of dispersing and dissolving difficultly soluble pectin which comprises mixing the pectin with an effervescent salt of a strong base and a weak acid and a dry organic acid in a quantity at least sufficient to decompose the effervescent salt, and placing the mixture in an aqueous medium whereby, through the interaction of the organic acid and the salt, effervescence is produced and the pectin is thereby dispersed in the aqueous medium and its solution facilitated.

20. The method of dispersing and dissolving difficultly soluble pectin which comprises placing in an aqueous medium a mixture of the pectin with an effervescent salt of a strong base and a weak acid and a dry organic acid whereby, through the interaction of the organic acid and the salt, effervescence is produced and the pectin is dispersed in the aqueous medium and its solution facilitated.

21. A pectin product which is a mixture of pectin with a salt of a strong base and a weak acid in such proportions that the pH of the mixture lies between 3.4 and 7.0.

22. A finely divided pectin preparation containing pectin and sodium acetate.

23. A finely divided pectin preparation containing pectin and sodium citrate.

24. A finely divided pectin preparation containing pectin, sodium acetate and a dry organic acid.

25. A dry pectin product containing sodium acetate, said product having a pH of 3.4 to 7.0.

26. A dry pectin product containing sodium citrate, said product having a pH of 3.4 to 7.0.

27. A pectin product adapted for use in the manufacture of commercial jellies, comprising a dry mixture of pectin and a salt of a strong base and a weak acid.

ELOISE JAMESON.

CERTIFICATE OF CORRECTION.

Reissue No. 19,197. June 5, 1934.

ELOISE JAMESON.

It is hereby certified that error appears in the printed specification of the above numbered patent requiring correction as follows: Page 1, first column, line 46, strike out the word "neutral"; and that the said Letters Patent should be read with this correction therein that the same may conform to the record of the case in the Patent Office.

Signed and sealed this 8th day of March, A. D. 1938.

(Seal)

Henry Van Arsdale,
Acting Commissioner of Patents.